US005865488A

United States Patent [19]

Engelberger

[11] Patent Number: 5,865,488

[45] Date of Patent: Feb. 2, 1999

[54] FIRE HOSE ENGAGEMENT RING

[76] Inventor: William J. Engelberger, 219 W. Chery St., Shenandoah, Pa. 17976

[21] Appl. No.: 954,578

[22] Filed: Oct. 20, 1997

[51] Int. Cl.[6] .............................. B65G 7/12; A62C 33/04

[52] U.S. Cl. ............................ 294/15; 294/104; 294/142; 248/75

[58] Field of Search .............................. 294/15, 16, 31.2, 294/103.1, 104, 137, 142, 165, 169, 119.2; 248/62, 74.1, 76, 75; 24/16 R, 270, 273

[56] References Cited

U.S. PATENT DOCUMENTS

| | | | |
|---|---|---|---|
| 128,155 | 6/1872 | Lowe | 294/15 |
| 877,012 | 1/1908 | Sullivan | 294/15 |
| 1,275,068 | 8/1918 | Messiter | 294/16 |
| 3,828,403 | 8/1974 | Perrin et al. | 24/273 |
| 4,470,177 | 9/1984 | Ganung et al. | 294/16 |

*Primary Examiner*—Dean Kramer

[57] ABSTRACT

A new fire hose engagement ring for facilitating pulling of a fire hose by a fireman. The inventive device includes a circular ring that is dimensioned for coupling over a fire hydrant. First and second U-shaped latch fittings are secured to an outer periphery of the circular ring. An arcuate latch is provided having a first end portion and a second end portion. The first end portion is received within the first U-shaped latch fitting with a pivot pin extending therebetween. The second end portion is received within the second U-shaped latch fitting in a closed orientation. A locking pin slidably engages the second U-shaped latch and the second end portion of the arcuate latch.

5 Claims, 2 Drawing Sheets

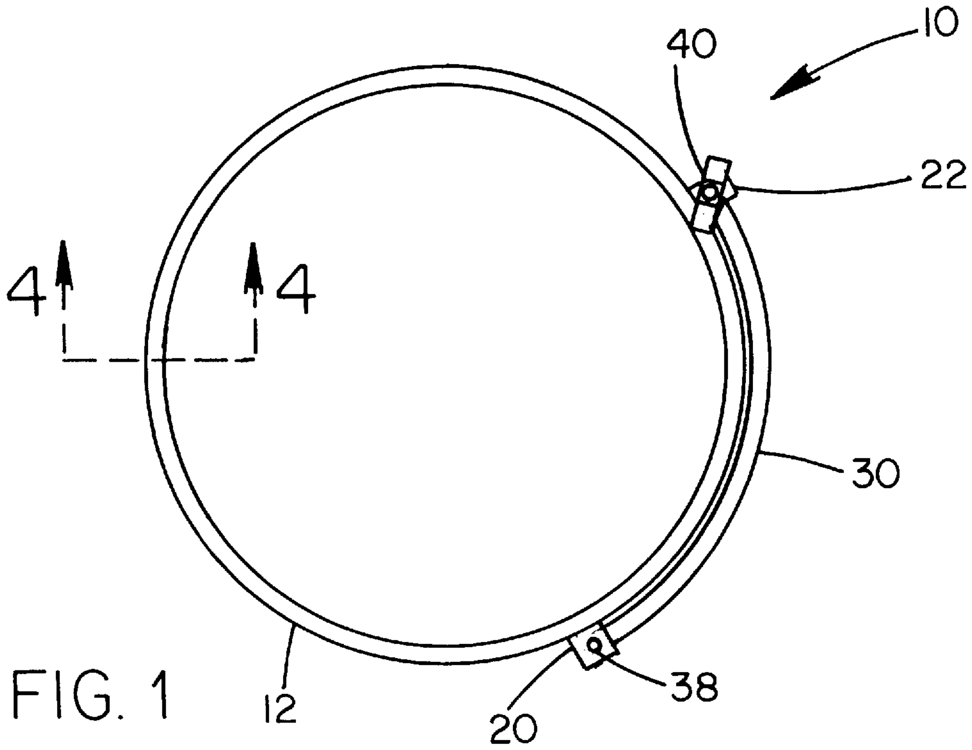
FIG. 1
FIG. 2
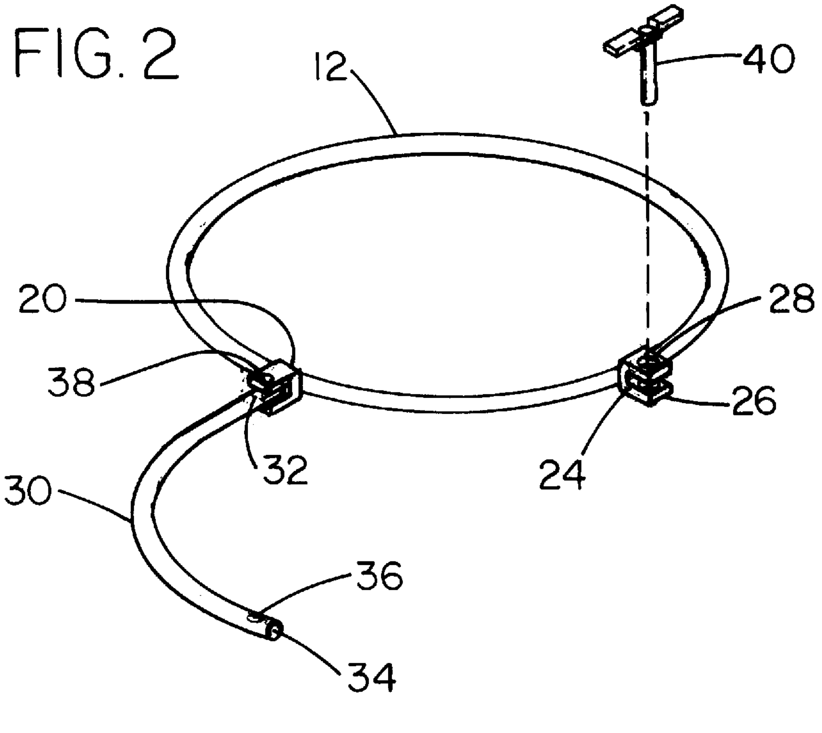

FIRE HOSE ENGAGEMENT RING

BACKGROUND OF THE INVENTION

1. Field of the Invention

The present invention relates to hose carriers and more particularly pertains to a new fire hose engagement ring for facilitating pulling of a fire hose by a fireman.

2. Description of the Prior Art

The use of hose carriers is known in the prior art. More specifically, hose carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art hose carriers include U.S. Pat. No. 4,762,257 to Spillers et al.; U.S. Pat. No. 5,110,023 to Colin; U.S. Pat. No. 4,425,000 to Keck, Jr.; U.S. Pat. No. 4,531,661 to Santy; U.S. Pat. No. 4,220,293 to Gename; and U.S. Pat. No. Des. 318,413 to McNulty, Jr.

While these devices fulfill their respective, particular objectives and requirements, the aforementioned patents do not disclose a new fire hose engagement ring. The inventive device includes a circular ring that is dimensioned for coupling over a fire hydrant. First and second U-shaped latch fittings are secured to an outer periphery of the circular ring. An arcuate latch is provided having a first end portion and a second end portion. The first end portion is received within the first U-shaped latch fitting with a pivot pin extending therebetween. The second end portion is received within the second U-shaped latch fitting in a closed orientation. A locking pin slidably engages the second U-shaped latch and the second end portion of the arcuate latch.

In these respects, the fire hose engagement ring according to the present invention substantially departs from the conventional concepts and designs of the prior art, and in so doing provides an apparatus primarily developed for the purpose of facilitating pulling of a fire hose by a fireman.

SUMMARY OF THE INVENTION

In view of the foregoing disadvantages inherent in the known types of hose carriers now present in the prior art, the present invention provides a new fire hose engagement ring construction wherein the same can be utilized for facilitating pulling of a fire hose by a fireman.

The general purpose of the present invention, which will be described subsequently in greater detail, is to provide a new fire hose engagement ring apparatus and method which has many of the advantages of the hose carriers mentioned heretofore and many novel features that result in a new fire hose engagement ring which is not anticipated, rendered obvious, suggested, or even implied by any of the prior art hose carriers, either alone or in any combination thereof.

To attain this, the present invention generally comprises a circular ring having an inner layer fabricated of steel and an outer layer fabricated of an insulating material. The circular ring is dimensioned for coupling over a fire hydrant. First and second U-shaped latch fittings are secured to an outer periphery of the circular ring. The latch fittings are separated by an arc of less than ninety degrees. Each of the latch fittings has a horizontal portion and opposed vertical portions. The horizontal portions are secured to the circular ring with the opposed vertical portions extending outwardly from the circular ring. The opposed vertical portions each have an aperture directed therethrough. An arcuate latch is provided having a first end portion and a second end portion. The first end portion and the second end portion have a transverse-oriented hole directed therethrough. The first end portion is received between the opposed vertical portions of the first U-shaped latch fitting with a pivot pin extending through the apertures and hole thereof. The second end portion is received between the opposed vertical portions of the second U-shaped latch fitting in a closed orientation with the apertures aligned with the hole. A locking pin is slidably received through the aligned apertures of the second U-shaped latch and the hole of the second end portion of the arcuate latch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fire hose engagement ring apparatus and method which has many of the advantages of the hose carriers mentioned heretofore and many novel features that result in a new fire hose engagement ring which is not anticipated, rendered obvious, suggested, or even implied by any of the prior art hose carriers, either alone or in any combination thereof.

It is another object of the present invention to provide a new fire hose engagement ring which may be easily and efficiently manufactured and marketed.

It is a further object of the present invention to provide a new fire hose engagement ring which is of a durable and reliable construction.

An even further object of the present invention is to provide a new fire hose engagement ring which is susceptible of a low cost of manufacture with regard to both materials and labor, and which accordingly is then susceptible of low prices of sale to the consuming public, thereby making such fire hose engagement ring economically available to the buying public.

Still yet another object of the present invention is to provide a new fire hose engagement ring which provides in the apparatuses and methods of the prior art some of the advantages thereof, while simultaneously overcoming some of the disadvantages normally associated therewith.

Still another object of the present invention is to provide a new fire hose engagement ring for facilitating pulling of a fire hose by a fireman.

Yet another object of the present invention is to provide a new fire hose engagement ring which includes a circular ring that is dimensioned for coupling over a fire hydrant. First and second U-shaped latch fittings are secured to an outer periphery of the circular ring. An arcuate latch is provided having a first end portion and a second end portion. The first end portion is received within the first U-shaped latch fitting with a pivot pin extending therebetween. The second end portion is received within the second U-shaped latch fitting in a closed orientation. A locking pin slidably engages the second U-shaped latch and the second end portion of the arcuate latch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top plan view of a new fire hose engagement ring according to the present invention.

FIG. 2 is a perspective view of the present invention.

DESCRIPTION OF THE PREFERRED EMBODIMENT

Figure 3:
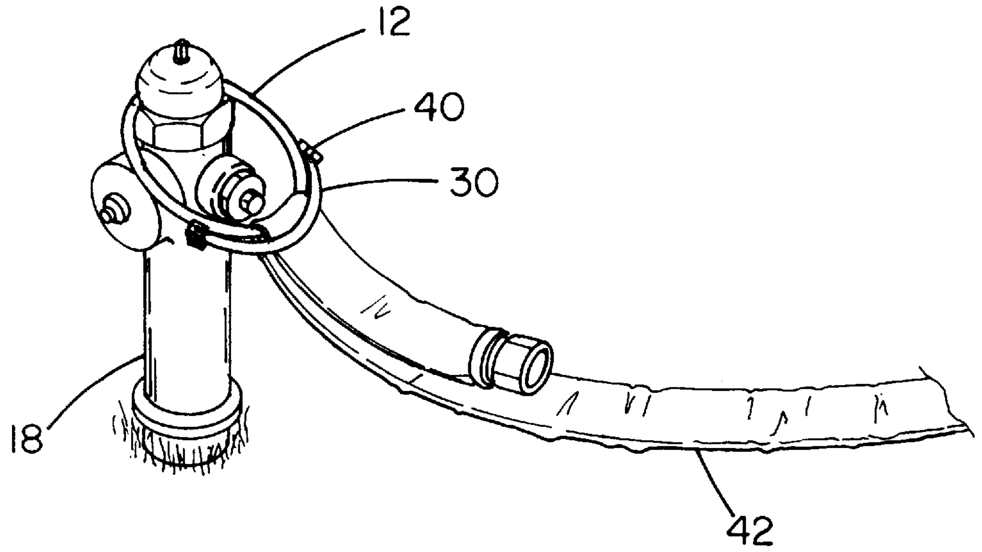
FIG. 3 is a perspective view of the present invention illustrated in use.
Figure 4:
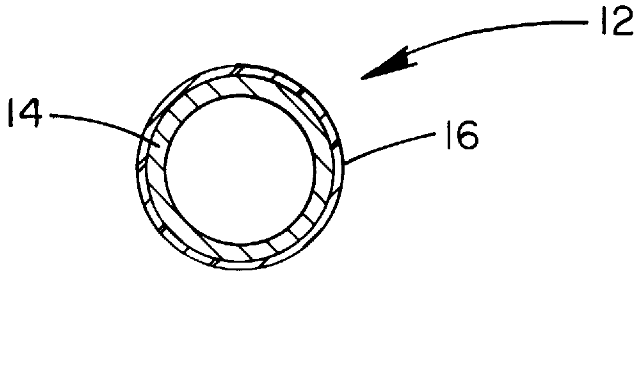
FIG. 4 is a cross-sectional view of the present invention as taken along line 4—4 of FIG. 1.

With reference now to the drawings, and in particular to FIGS. 1 through 4 thereof, a new fire hose engagement ring embodying the principles and concepts of the present invention and generally designated by the reference numeral 10 will be described.

As best illustrated in FIGS. 1 through 4, the fire hose engagement ring 10 comprises a circular ring 12 having an inner layer 14 fabricated of steel and an outer layer 16 fabricated of an insulating material. The circular ring 12 is dimensioned for coupling over a fire hydrant 18.

First and second U-shaped latch fittings 20,22 are secured to an outer periphery of the circular ring 12. The latch fittings 20,22 are separated by an arc of less than ninety degrees. Each of the latch fittings 20,22 has a horizontal portion 24 and opposed vertical portions 26. The horizontal portions 24 are secured to the circular ring 12 with the opposed vertical portions 26 extending outwardly from the circular ring 12. The opposed vertical portions 26 each have an aperture 28 directed therethrough.

An arcuate latch 30 is provided having a first end portion 32 and a second end portion 34. The first end portion 32 and the second end portion 34 each have a transverse-oriented hole 36 directed therethrough. The first end portion 32 is received between the opposed vertical portions 26 of the first U-shaped latch fitting 20 with a pivot pin 38 extending through the apertures 28 and hole 36 thereof. The second end portion 34 is received between the opposed vertical portions 26 of the second U-shaped latch fitting 22 in a closed orientation with the apertures 28 aligned with the hole 36.

A locking pin 40 is slidably received through the aligned apertures 28 of the second U-shaped latch 22 and the hole 36 of the second end portion 34 of the arcuate latch 30.

In use, the device 10 would first be attached a foot or two in from an outer end of the fire hose 42 stored in the back of a pumper or related fire truck. This would be achieved by looping the hose 42 through the circular ring 12 at a point between the first and second latch fittings 20,22. The arcuate latch 30 could then be pivoted over the hose 42 and locked in place with the locking pin 40. The hydrant operator would pull the hose 42 out of the back of the truck by holding onto the circular ring 12 and then seat it over the top of the hydrant 18. The truck could then continue down the street, thereby playing out the hose 42. The arcuate latch 30 could then be opened, thereby permitting the hose 42 to be connected to the hydrant 18 in a conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new fire hose engagement ring for facilitating pulling of a fire hose by a fireman comprising, in combination:

a circular ring having an inner layer fabricated of steel and an outer layer fabricated of an insulating material, the circular ring being dimensioned for coupling over a fire hydrant;

first and second U-shaped latch fittings secured to an outer periphery of the circular ring, the latch fittings being separated by an arc of less than ninety degrees, each of the latch fittings having a horizontal portion and opposed vertical portions, the horizontal portions secured to the circular ring with the opposed vertical portions extending outwardly from the circular ring, the opposed vertical portions each having an aperture directed therethrough;

an arcuate latch having a first end portion and a second end portion, the first end portion and the second end portion each having a transverse-oriented hole directed therethrough, the first end portion received between the opposed vertical portions of the first U-shaped latch fitting with a pivot pin extending through the apertures and hole thereof, the second end portion received between the opposed vertical portions of the second U-shaped latch fitting in a closed orientation with the apertures aligned with the hole; and a locking pin slidably received through the aligned apertures of the second U-shaped latch and the hole of the second end portion of the arcuate latch.

2. A new fire hose engagement ring for facilitating pulling of a fire hose by a fireman comprising, in combination:

a circular ring dimensioned for coupling over a fire hydrant;

first and second U-shaped latch fittings secured to an outer periphery of the circular ring;

an arcuate latch having a first end portion and a second end portion, the first end portion received within the first U-shaped latch fitting with a pivot pin extending therebetween, the second end portion received within the second U-shaped latch fitting in a closed orientation; and a locking pin slidably engaging the second U-shaped latch and the second end portion of the arcuate latch;

wherein each of the latch fittings has a horizontal portion and opposed vertical portions, the horizontal portions secured to the circular ring with the opposed vertical portions extending outwardly from the circular ring.

3. The fire hose engagement ring as set forth in claim 2 wherein the circular ring has an inner layer fabricated of steel and an outer layer fabricated of an insulating material.

4. The fire hose engagement ring as set forth in claim 2 wherein the latch fittings are separated by an arc of less than ninety degrees.

5. A new fire hose engagement ring for facilitating pulling of a fire hose by a fireman comprising, in combination:

a closed loop unitary circular ring dimensioned for coupling over a fire hydrant;

first and second fittings secured to an outer periphery of the circular ring; and a unitary arcuate latch having a radius of curvature similar to that of the ring, the latch including a first end portion and a second end portion, the first end portion hingably received within the first fitting, the second end portion lockably received within the second fitting in a closed orientation, wherein a fire hose may be clamped between the latch and the ring.

* * * * *